US007852964B2

(12) United States Patent  (10) Patent No.: US 7,852,964 B2
Rajappan et al.  (45) Date of Patent: Dec. 14, 2010

(54) ANTIJAM FILTER SYSTEM AND METHOD FOR HIGH FIDELITY HIGH DATA RATE WIRELESS COMMUNICATION

(75) Inventors: Gowri Shankar Rajappan, Arlington, MA (US); Ravi Sivasankaran, Billerica, MA (US); John Cafarella, Boston, MA (US)

(73) Assignee: Mayflower Communications Company, Inc., Burlington, MA (US)

( * ) Notice: Subject to any disclaimer, the term of this patent is extended or adjusted under 35 U.S.C. 154(b) by 155 days.

(21) Appl. No.: 11/455,546

(22) Filed: Jun. 19, 2006

(65) Prior Publication Data

US 2007/0291866 A1 Dec. 20, 2007

(51) Int. Cl.
*H04B 7/02* (2006.01)
(52) U.S. Cl. .................. 375/267; 375/144; 375/148; 375/147; 343/860; 343/700 MS; 340/572.1; 340/10.2
(58) Field of Classification Search ................. 375/144, 375/148, 147, 346, 347, 260, 267; 342/357.16; 340/10.2, 572.1; 343/860, 700 MS
See application file for complete search history.

(56) References Cited

U.S. PATENT DOCUMENTS

| 5,260,968 | A | * | 11/1993 | Gardner et al. ............... 375/347 |
| 5,268,927 | A | * | 12/1993 | Dimos et al. ................. 375/147 |
| 5,596,600 | A | * | 1/1997 | Dimos et al. ................. 375/148 |
| 5,694,416 | A | * | 12/1997 | Johnson ....................... 375/148 |
| 6,078,284 | A | * | 6/2000 | Levanon ................. 342/357.16 |
| 6,097,771 | A | | 8/2000 | Foschini |
| 6,115,409 | A | * | 9/2000 | Upadhyay et al. ........... 375/144 |
| 6,317,466 | B1 | | 11/2001 | Foschini |
| 6,763,073 | B2 | | 7/2004 | Foschini |
| 7,667,652 | B2 | * | 2/2010 | Gevargiz et al. ....... 343/700 MS |
| 2001/0017883 | A1 | * | 8/2001 | Tiirola et al. ................ 375/148 |
| 2004/0228392 | A1 | * | 11/2004 | Zhang et al. ................ 375/148 |
| 2005/0043943 | A1 | * | 2/2005 | Wang et al. ................. 704/201 |
| 2006/0279408 | A1 | * | 12/2006 | Atkins et al. ............... 340/10.2 |
| 2007/0127608 | A1 | * | 6/2007 | Scheim et al. .............. 375/346 |
| 2007/0263704 | A1 | * | 11/2007 | Nagarajan et al. ........... 375/148 |
| 2008/0012710 | A1 | * | 1/2008 | Sadr ......................... 340/572.1 |
| 2008/0018431 | A1 | * | 1/2008 | Turner et al. ............... 340/10.2 |
| 2008/0030422 | A1 | * | 2/2008 | Gevargiz et al. ............ 343/860 |

OTHER PUBLICATIONS

"Blind Multiuser Detection with Array Observations"; Fonollosa et al.; Wireless Personal Communications Journal; pp. 179-196; 1998.*
Simon Haykin, "Adaptive Filter Theory," Fourth Edition, Prentice Hall, 2002, Chapter 5, 9, and 16. Summaries attached.

(Continued)

*Primary Examiner*—Sudhanshu C Pathak
(74) *Attorney, Agent, or Firm*—Kaplesh Kumar (57) ABSTRACT

An antijam filter and method for filtering interference signals from signals received from the desired user in spatially multiplexed wireless communication systems. The antijam filter estimates the interference from known and unknown sources, and uses that estimate to filter the interference from the received signals. The filtered desired user signals are rendered for further signal processing using existing methods. The antijam filter and method are modular, with applicability to a wide range of wireless communication systems employing multiple antennas at the receiver.

51 Claims, 8 Drawing Sheets

OTHER PUBLICATIONS

L. Zhao et al, "Mitigation of Periodic Interferers in GPS Receivers using Subspace Projection Techniques," Proc. 6th Int. Symp. on Sig Processing and its App, vol. 2, Aug. 2001.

P.W. Wolniansky etal, "V-Blast: An Architecture for Realizing Very High Data Rates over the Rich-scattering Wireless Channel," Proc. ISSSE, Sep. 1998, pp. 295-300.

G. D. Golden et al, "Detection Algorithm and Initial Laboratory Results using V-Blast Space-time Communication Architecture," Electr. Lett., V. 35, Jan. 7, 1999, pp. 14-15.

T. Tang and R. W. Heath, Jr., "Space-time interference cancellation in MIMO-OFDM systems," IEEE Trans. on Vehicular Technol., vol. 54, No. 5, Sep. 2005, pp. 1802-1816.

Joseph Mitola, III, "Software Radio Architecture: Object-Oriented Approaches to Wireless Systems Engineering," John Wiley & Sons, Inc. 2000.

R. Trepkowski, "Channel Estimation Strategies for Coded MIMO Systems," M.S. Thesis, Virginia Polytechnic University, Blacksburg, VA, Jun. 2004.

S. J. Grant et al, "Performance Enhancement Through Joint Detection of Cochannel Signals Using Diversity Arrays," IEEE Trans. on Commun., vol. 46, Aug. 1998, pp. 1038-1049.

NTIA (National Telecommunications and Information Administration) Report No. 94-303-1.

\* cited by examiner

ANTIJAM FILTER SYSTEM AND METHOD FOR HIGH FIDELITY HIGH DATA RATE WIRELESS COMMUNICATION

BACKGROUND OF THE INVENTION

The instant invention relates to high fidelity, high data rate wireless communication systems.

The communication radio frequency spectrum is a valuable commodity. Part of the bandwidth is licensed and regulated by the government for its own use and that of commercial wireless communication systems, such as the cellular communication standard Universal Mobile Telecommunications System (UMTS). The remaining bandwidth is unlicensed and populated mostly with low cost wireless communication systems, including the wireless local area network (WLAN) standard IEEE 802.11. The increasing demand for bandwidth-intensive applications over wireless links requires maximizing the data rate in the available bandwidth. The capacity of a communication channel, also known as the Shannon capacity, is the upper limit on the achievable data rate through the channel in the presence of noise, and is a function of the available bandwidth and the available transmit power.

The achieved data rates are limited by errors in data transmission related to low signal levels at the receiver, relative to noise and interference. The low strength signal is difficult to detect reliably, leading to loss in fidelity. Because of the resulting increased error rate, re-transmissions are required and this results in a lowered effective data rate. The noise is typically due to thermal and other electronic noise in the receiver, while the interference is due to corrupting radio signals received from sources known or unknown, such as additional users or adversaries using jammers intent on disrupting communication. The interference is more acute in the unlicensed bandwidth because of the lack of government supervision.

The signal to noise strength ratio (SNR) at the receiver provides a measure of the fidelity for a wireless communication system. SNR is the ratio of the power of the desired signal to the power in the background noise as measured at the receiver. Higher SNR correlates with higher fidelity data transmission, and fewer requested re-transmissions. A bit error rate (BER) of $10^{-2}$ or lower renders communication feasible. Lower BER values result in improved fidelity. As an example, a system with a BER value of $10^{-6}$ provides higher fidelity than one with a BER of $10^{-4}$. The SNRs that achieve these BERs provide high fidelity wireless communication. Interference signals, when present, lower the signal to (interference-plus) noise ratio, thus increasing the BER and degrading the performance.

When some defining characteristics of the interferers are known, such as the statistics of the signals they transmit and estimates of the transformations that those signals undergo as they traverse the wireless channels, multi user detection (MUD) techniques can be used to suppress the interference and increase the SNR. See e.g., Sergio Verdu, "Multiuser Detection," Cambridge University Press, 1998. These techniques, however, are computationally complex, assume a degree of knowledge about the interferers, and are specialized to the wireless communication technology for which they are developed.

Where, before transmitting any user data signals, the communication system transmits a training sequence, i.e. a pattern of signals known a priori by both the transmitter and the receiver, the training sequence can be exploited at the receiver to mitigate interference in the wireless channel through the use of adaptive gradient search algorithms like the Lease Mean Squares (LMS) and the Recursive Least Squares (RLS) techniques, or sub-space projection techniques. See e.g., Simon Haykin, "Adaptive Filter Theory," Fourth Edition, Prentice Hall, 2002, Chapter 5 & Chapter 9; L. Zhao, M. G. Amin, and A. R. Lindsey, "GPS Anti-jam via Subspace Projection: A Performance Analysis for FM Interference in the C/A Code," Digital Signal Processing, Volume 12, Issues 2-3, 2002. The presence of the training sequence, however, decreases the overall throughput of the system. Blind techniques can be used when training sequences are not available, but the blind techniques are in general computationally expensive, non-modular, and have poor overall performance. See e.g., Simon Haykin, "Adaptive Filter Theory," Fourth Edition, Prentice Hall, 2002, Chapter 16.

If the directionalities of the desired users and interferers are known, or can be inferred, antenna-based techniques can provide interference mitigation. For instance, the radiation pattern of a multiple antenna array at the receiver can be designed to locate nulls in the directions of the interference signals (null steering), and peaks in the directions of the desired signals (beam steering). Conversely, the transmitter antenna array radiation patterns can be modified to have the peaks coincide with the desired receiver antennas and the nulls with those of the users with whom it is desired not to interfere.

Where multiple copies of the same transmitted signal are available at the receiver, the receiver can use these copies to increase reliability of reception. In such "diversity" systems, copies of the transmitted signal may be obtained at multiple time instances (time diversity), across multiple receive antennas (space diversity), or a combination of the two (space-time diversity).

Interference cancellation in diversity systems are subjects of existing United States patents. For instance, U.S. Pat. Nos. 5,268,927 and 5,596,600 use multiple signals received at successive times as input to a digital Adaptive Transversal Filter to cancel out the interference. For effective performance, however, the interference needs to be correlated in time. Where the interference signal is random, without significant correlation between the signals received at successive times, the performance degrades.

Multiple antenna interference cancellation techniques depend on specialized assumptions, and suffer from a high computational burden. For instance, U.S. Pat. No. 5,694,416 assumes knowledge of the directionality of the desired transmitter. Estimation of the directionality increases the computational burden. Interference mitigation is achieved at the receiver by maximizing the ratio of the desired signal power to the interference power. The technique, however, is unable to distinguish between transmissions from co-located transmitter antennas, as in conventional multi-input multi-output (MIMO) systems. Integrated adaptive spatial-temporal techniques, using signals received at multiple successive time instances and across multiple antennas, as in U.S. Pat. No. 6,115,409, are too complex for high data rate systems, since the signals from the successive time instances have to be buffered and many more filter coefficients have to be computed compared to where only multiple antenna signals are used. The receiver of U.S. Pat. No. 6,115,409 has knowledge of the desired (satellite) transmitter and its pseudorandom noise (PN) code, which it uses to demodulate the signal received from the satellite, a process that results in a partial decorrelation of the interference signals received with the satellite signal. The integrated adaptive spatial-temporal filter, which employs ongoing concurrent feedback for optimizing the filter coefficients for maximizing the signal-to-interference-plus-noise ratio (SINR), provides significant filtering of interference signals beyond that achieved in the subsequent receiver processing by the inherent partial decorrelation of the signals.

Wireless communication systems employing spatial multiplexing with multiple antennas at the transmitter and the receiver have yielded among the highest communication data rates in a given frequency bandwidth. Spatial multiplexing involves splitting the source data into multiple data streams and transmitting them simultaneously on separate antennas. Although the antennas operate at the same radio frequency, the data streams undergo independent fading as they travel their individual paths to the receiver antennas. Where the receiver antennas are spaced physically apart from each other by at least one-half of the transmitted radio wavelength, the data streams arrive spatially uncorrelated. They can be distinguished from each other through an estimation of their channel transformations by using algorithms known in the art, e.g., V-BLAST (P. W. Wolniansky, G. J. Foschini, G. D. Golden, and R. A. Valenzuela, "V-BLAST: An Architecture for Realizing Very High Data Rates over the Rich-scattering Wireless Channel," Proc. ISSSE, Sept 1998, pp. 295-300; G. D. Golden, G. J. Foschini, R. A. Valenzuela, and P. W. Wolniansky, "Detection Algorithm and Initial Laboratory Results using V-BLAST Space-time Communication Architecture," Electronics Letters, vol. 35, No. 1, Jan. 7, 1999, pp. 14-15). By transmitting and receiving multiple data streams simultaneously on separate antennas operating at the same radio frequency, higher data rates are achieved compared to where a single data stream is communicated.

In spatially multiplexed MIMO systems, if the number of receiver antennas equal or exceed the number of the transmitted data streams and if the independent fading channels corresponding to these data streams are known for transmissions with sufficiently high SNR (for high fidelity), then all of the transmitted data streams can be detected and a spectral efficiency approximately proportional to the number of transmitted data streams achieved. These prior art MIMO systems, however, are largely unable to cope with interference from co-channel jamming signals, hostile or otherwise. The lowered SNR causes the error rates to degrade and the data rates to suffer unacceptably due to the requested re-transmissions.

An example of co-channel interference mitigation in MIMO systems is provided by a MIMO-OFDM (OFDM=orthogonal frequency-division multiplexing) system using a space-time equalizer for filtering the interfering signals, as described in T. Tang and R. W. Heath, Jr., "A Direct Training-based Method for Joint Space-Time Interference Cancellation in MIMO-OFDM Systems," Proc. IEEE GLOBECOM 2004. Space-time equalization uses two-dimensional filters in the spatial and time domains for compensation of distortions in band-limited channels. The performance of this technique, however, depends on calculating the filter coefficients through a training sequence, a facility unavailable in hostile environments. This approach also does not readily adapt to other wireless technologies.

For MIMO type high data rate wireless communication systems, a low complexity and modular digital interference suppression scheme that acts on the instantaneous signals without requiring a training sequence or concurrent feedback is desired. Modularity denotes the ability to apply the technique to a wide range of wireless communication systems. Thus, communication systems already deployed may be upgraded for interference protection, and the technique can be integrated with the Software Defined Radio (SDR) technology, which implements multiple wireless communication technologies on a common hardware platform. See e.g. Joseph Mitola, III, "Software Radio Architecture: Object-Oriented Approaches to Wireless Systems Engineering," John Wiley & Sons, Inc. 2000.

The invention herein provides the hitherto unavailable, but highly desirable, modular, low complexity, multiple-antenna based mitigation system and method that is effective against hostile co-channel interference in a variety of high data rate wireless communication systems (including MIMO-OFDM and MIMO-CDMA), and that does not require user knowledge, concurrent feedback, or a training sequence.

BRIEF SUMMARY OF THE INVENTION

The multiple-antenna based antijam filter and method of the present invention allow improved high fidelity, high speed wireless data communication by removing the interference from spatially multiplexed signals received from the desired user. The wireless links between the users of the wireless communication system include two-way communication links over fading multi-path rich scattering channels.

The antijam filter reduces the interference signals from hostile jammers and other sources by combining the received signals using an algorithm that de-correlates the interference signals across the multiple receiver antennas. Combining the signals is a means of using multiple copies of the same transmitted data stream at the receiver advantageously to improve performance by increasing the received signal-to-noise ratio. Antijam is performed on the signals before additional operations, such as MIMO detection, and thus does not alter the downstream signal processing.

The antijam filter can be used in a modular fashion with most MIMO wireless reception algorithms. The spatially multiplexed data streams received from the desired user maintain their identities during filtering, and the signal stream, after antijam, contains the spatially multiplexed data streams from the desired user with reduced/eliminated interference from the jammers and other sources. This filtered signal can be processed using a low-complexity optimal or suboptimal MIMO reception scheme, such as V-BLAST, to extract the transmitted data streams in a reliable manner. The antijam filter is especially effective when the receiver has more antennas than the transmitter, and this excess of the receiver antennas equals or exceeds the number of jammers and any other sources of interference signals.

While the interference immunity embodied in the antijam filter herein is especially attractive for maximizing the data traffic in wireless communication systems employing MIMO, because of its dependence on the spatial diversity achieved using multiple transmitter and multiple receiver antennas, other similar two way wireless communication systems prone to hostile interference also gain from the instant invention's modularity and are within the scope of the instant invention. Examples include OFDM, CDMA, and the like. The only requirement is that more than one antenna be present at the receiver. Wireless systems lacking spatial diversity at the transmitter, by virtue of employing only one antenna, but having more than one antenna at the receiver comprise degenerate MIMO systems and are within the scope of the present invention.

An object of the present invention is to provide an antijam filter that filters interference signals from the signals received from the desired user(s).

A second object of the present invention is to provide a method for filtering interference signals from the signals received from the desired user(s).

A third object of the present invention is to provide an antijam filter and method for filtering interference signals from the signals received from the desired user(s) for subsequent signal processing.

A fourth object of the present invention is to provide an antijam filter and method for filtering interference signals from the signals received from the desired user(s) without requiring knowledge of the users of the communication system.

Still another object of the present invention is to provide an antijam filter at the receiver of a wireless communication system for filtering interference signals from the signals received from the desired user(s) without the use of concurrent feedback or knowledge of the desired user(s) or the code required for demodulating the received desired user signals for subsequent signal processing using MIMO techniques.

Yet another object of the present invention is to provide an antijam filter at the receiver of a wireless communication system to filter interference signals from the signals received from the desired user(s) for subsequent signal processing using MIMO techniques.

An additional object of the present invention is to provide an antijam filter at the receiver of a wireless communication system to filter interference signals from the signals received from the desired user(s) for subsequent signal processing techniques requiring spatial diversity only at the receiver.

A further object of the present invention is to provide an antijam filter that facilitates high speed data communication by rendering the signals received free of interference signals, such as from jammers.

A still further object of the present invention is to provide an antijam filter and method to eliminate interference signals, such as from jammers, from the signals received from the desired user(s) for subsequent digital signal processing.

Another object of the present invention is to provide an antijam filter for a low complexity modular technique that does not require a training sequence for interference cancellation in a wide range of wireless communication systems.

These and other objects of the present invention are achieved in the preferred embodiment of the antijam filter and method described using the accompanying drawings. The drawings, however, are primarily for illustration and must not to be construed as limiting. The scope of the invention is to be limited only by the claims, and not by the drawings or description herein.

BRIEF DESCRIPTION OF THE SEVERAL VIEWS OF THE DRAWING

The objects, features, and attendant advantages of the present invention are more fully understood when considered in conjunction with the accompanying drawings.

DETAILED DESCRIPTION OF THE INVENTION

The antijam filter herein allows improved high speed wireless data communication by filtering interference signals from spatially multiplexed received signals without the use of a training sequence or concurrent feedback for estimating the SINR, or having prior knowledge of the desired user(s) or the code for demodulating the received signals, and can be used in modular fashion with most MIMO wireless reception systems. Spatial Multiplexing provides independent streams of data transmitted simultaneously in a wireless communication transmitter-receiver pair, each having a plurality of antennas. The filter is especially effective when the receiver of the wireless communication system has more antennas than the transmitter, and this excess of the receiver antennas equals or exceeds the number of sources of interference signals. In addition to wireless communication systems employing MIMO, other similar two way wireless communication systems, such as OFDM and CDMA, also gain from the instant invention's modularity and are within the scope of the present invention.

Figure 1:
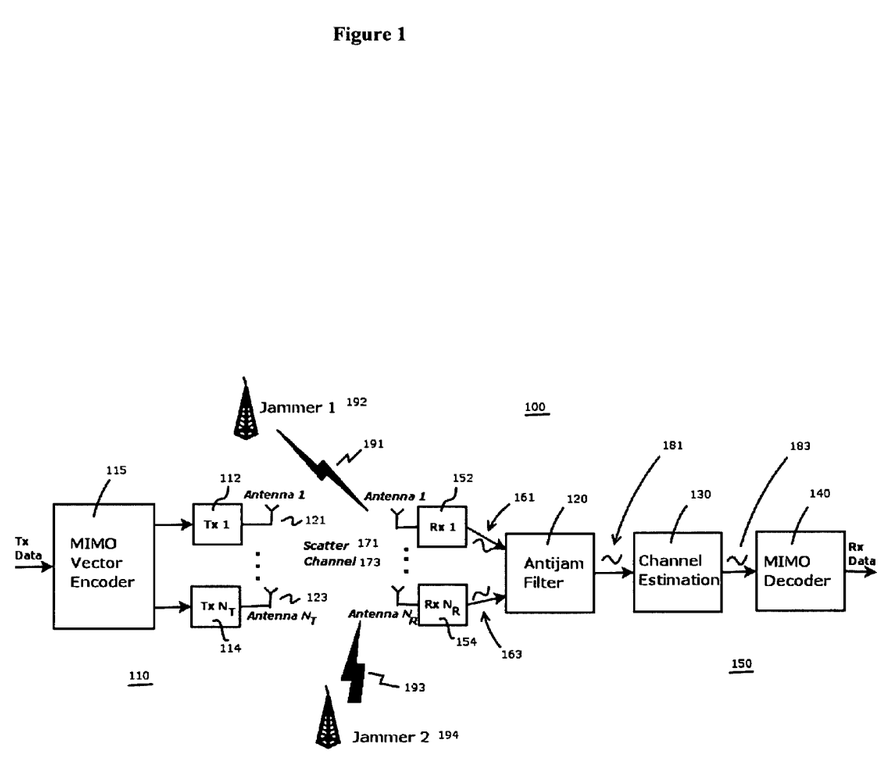
FIG. 1 illustrates a block-diagram of a system of multiple wireless transmitter and receiver antennas employing the antijam filter of this invention.

FIG. 1 presents a block diagram of a MIMO wireless communication system 100 employing $N_T$ antennas 112, 114 etc. at the desired user transmitter 110 for transmitting digital data and $N_R$ antennas 152, 154 etc. at the receiver 150. The same receiver antennas 152 etc. receive signals 121, 123 etc. from the desired user transmitter 110 and signals 191, 193 etc. from undesired sources 192, 194 etc. (henceforth, interferers or jammers). The jammers, e.g. 192., are active in the same frequency band as the desired user transmitter 110, either deliberately to prevent reliable communication (in which case the interferer, e.g. 192, is a hostile jammer), or unintentionally in the course of normal operation of the communication system.

The data received at a given receiver antenna, e.g. 154, consists of data 121, 123 etc. from the desired user transmitter 110 and undesired add-on interference signal, e.g. 191, from the jammers 192, 194 etc. These interference signals augment the inherent noise in the receiver 150 to further limit the wireless system's SNR. The antijam filter 120 employs an algorithm that filters the interference from the received signals, and prevents this resulting additional loss in SNR.

In the quasi-static, or slow varying, channel assumption prevalent in the art, the time variation of the wireless channels, e.g. 171, 173 etc., can be ignored within a symbol block. A symbol is an alphabet used to represent a group of bits in the communication system. A symbol block refers to the packet of data of specific duration containing multiple symbols.

Since the duration can be chosen to be arbitrarily small, the channel time invariant assumption within a symbol block is reasonable. Within the symbol block, this multiple-antenna arrangement of transmitter antennas, e.g. 112, and receiver antennas, e.g. 152, separated by wireless scatter channels, e.g. 171, can be represented in a complex baseband model as a $N_R \times N_T$ channel matrix H, whose elements embody the responses between the transmitter antennas, e.g. 112, and the receiver antennas, e.g. 152.

The elements of H can be assumed to be independent and identically distributed (i.i.d.) Rayleigh complex random variables, which, in the art, are known to be complex variables whose real and imaginary parts are i.i.d. normal-distributed random variables. The real and imaginary components are i.i.d. Gaussians with a mean of Zero and a variance of $1/\sqrt{2}$. This choice models rich-scatter fading multipath wireless channels, e.g. 171. A rich scatter fading multi-path wireless channel is one that is spatially uncorrelated and characterized by random time-variant gains from the changing physical characteristics of the media, such as scatterers and absorbers, through which the transmitted and received signals travel in free space.

The antennas, e.g. 112 at the transmitter 110 and e.g. 152 at the receiver 150, are spaced at appropriate distances from their respective neighboring antennas, e.g. 114 and 154 respectively, so that the data received by the receiver antennas, e.g. 152 and 154, remain uncorrelated. Antenna spacings of one-half the transmitted signal wavelength at the transmitter 110 and receiver 150 satisfy this condition. For the commonly used operational radio frequency of 5 GHz in the U.S. Unlicensed National Information Infrastructure (U-NII) band, this spacing calculates to $(3 \times 10^8 \text{ ms})/(2 \times 5 \times 10^9 \text{ Hz}) = 3$ cm. This small spacing requirement allows multiple antenna arrays to be constructed compactly.

The signals, e.g. 121 and 191, received at the receiver antenna, e.g. 152, are preferably first processed using the antijam filter 120 of the present invention to filter the jamming or other interference signals, e.g. 191, from the desired user signals, e.g. 121. The filter 120 reduces the interference signals, e.g. 191, by combining them using an algorithm that de-correlates the interference signals across the multiple receiver antennas. The spatially multiplexed data streams received from the desired user maintain their identities during filtering, and the signal stream, after antiiam, contains the spatially multiplexed data streams from the desired user with reduced/eliminated interference. The filtered signals 181 are rendered for additional processing 140 to reliably extract from them the transmitted data streams, e.g. 121, using one of several schemes, after the wireless channels of the transmitted signals, e.g. 121, have been estimated using techniques 130 known in the art. The schemes include, without limitation, processing using V-Blast, a sub-optimal MIMO algorithm. The filtered signals 181 for which the wireless channels have been estimated appear in FIG. 1 as 183.

Figure 2:
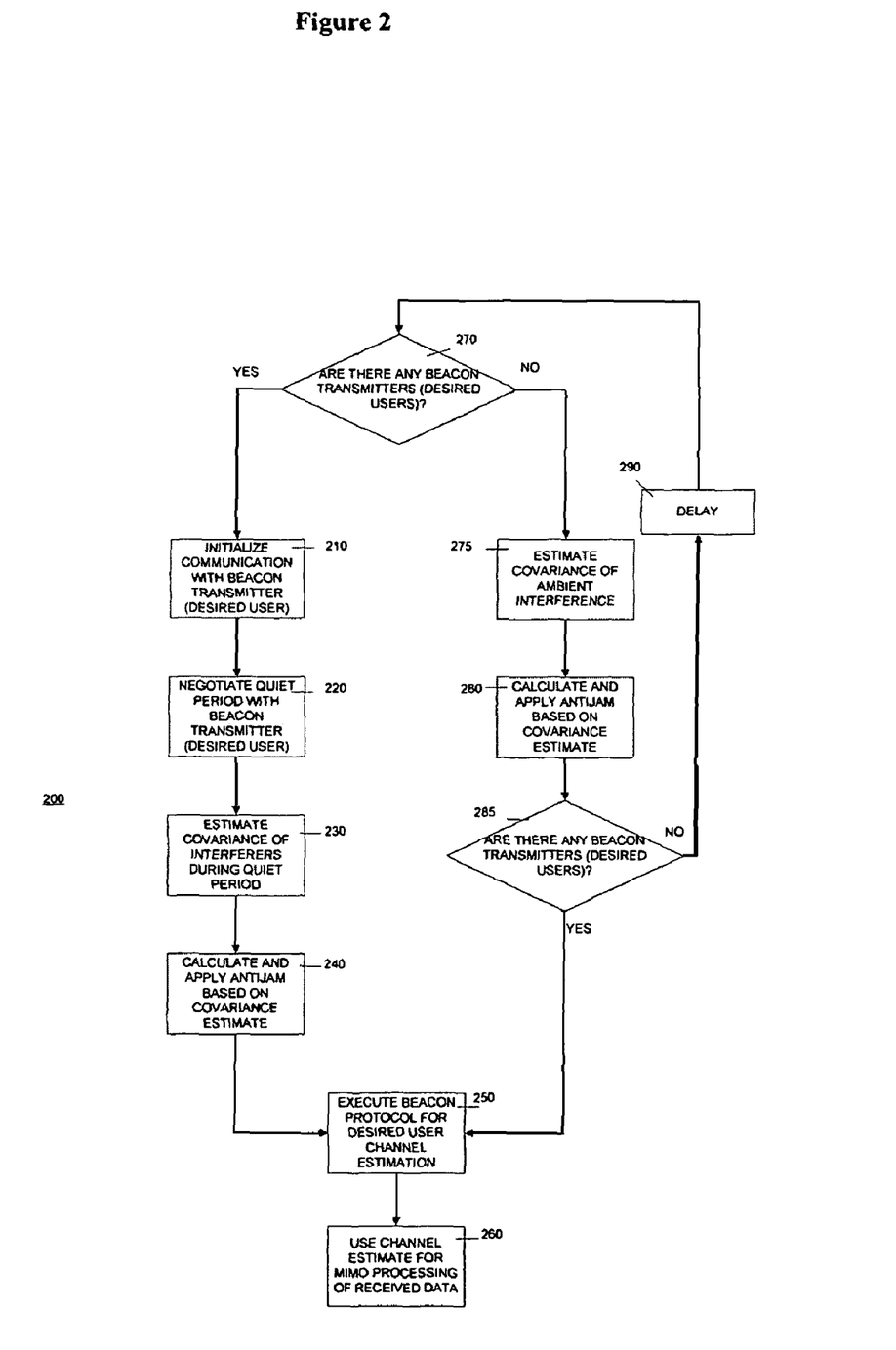
FIG. 2 illustrates the use of the antijam filter with MIMO spatial multiplexing.

A functional flowchart 200 of the preferred embodiment of the instant invention is shown in FIG. 2. The data is spatially multiplexed and encoded 115 at the transmitter 110 and transmitted as independent data streams, e.g. 121, from the different transmitter antennas, e.g. 112. The transmitter power is apportioned between the multiple data streams, e.g. 121, 123. To initialize data communication 270, the receiver 150 scans for a beacon signal so as to identify the source of the signals from the desired user, e.g. transmitter 110.

If the beacon signal is received 270-YES, the source of signals is identified and contact is established 210. The transmitter 110 and receiver 150 then negotiate a quiet period 220 using an algorithm. During the quiet period, the receiver executes another algorithm that estimates the interference-plus-noise covariance matrix 230. In step 240, the covariance matrix estimate 230 obtained thus is used to create and apply the antijam filter 120. A transmitter that is unwilling to negotiate the quiet period is a hostile transmitter, and the interference signals therefrom are filtered using the antijam filter 120.

If, on the other hand, the receiver does not detect any beacon signals from any transmitter in a fixed time 270-NO, the receiver automatically executes an algorithm to estimate the covariance matrix of the ambient interference-plus-noise 275. The covariance matrix estimate 275 is then used to create the antijam filter 120, which filters the ambient interference signals 280. The receiver 150 again scans the filtered signal for beacon signals from the desired user transmitter 285. If a beacon is found 285-YES, the source transmitter of that beacon signal 110 and the receiver 150 engage in steps 250 and 260 for channel estimation and subsequent MIMO processing. If no beacon signal is found in the filtered signal 285-NO, the receiver iteratively re-executes the beacon identification algorithm 270 after a delay 290.

Using the signal, 161, 163 etc., provided in a vector form to the antijam filter 120 by the receiver antenna array, 152, 154 etc., the covariance matrix estimate 230 or 275 is obtained using methods known in the art, such as the maximum likelihood estimate or the maximum a-posteriori estimate. The covariance matrix estimate 230 or 275 is used to compute the antijam filter 120. The antijam filter 120 filters the interference signals, e.g. 191, received from all sources other than the desired user transmitter 110.

The filtering works best if the interference statistics at the receiver 150 remain invariant during the period that it computes the covariance matrix estimate, 230 or 275, and applies the antijam filter 120 to the signals received, e.g. 161. Where the receiver 150 is mounted on a moving platform, covariance matrix estimation of the interference-plus-noise, 230 or 275, and antijam filtering 120 has to be performed in minimal time and the covariance matrix estimate, 230 or 275, updated periodically to track any changes in the interference statistics.

Estimating the covariance matrix, 230 or 275, is one way to generate the interference statistics required for the antijam filter 120. The covariance matrix estimate obtained during the quiet period has the advantage that transmission power is conserved. Furthermore, it provides accurate and useful statistics of the jammer, uninfluenced by the desired user transmission.

The antijam filter 120 is computed using the covariance matrix estimate at the receiver 150 and a steering matrix. Since the receiver does not depend on a known directionality for the desired user, an omni-directional matrix with equal Eigenvalue steering vectors is used. The antijam filter 120 can be computed, for example, using the Wiener filter technique, which minimizes the Mean Squared Error (MSE) between the transmitted signal, e.g. 121, and that actually received, e.g. 161 (which may be corrupted with interference and noise). This Wiener-based antijam filter is the product of the inverse of the covariance matrix estimate and the omni-directional steering matrix. The resulting antijam filter 120 comprises a matrix, whose numbers of rows and columns equal the total number of receiver antennas, 152, 154 etc. The filtering 240 at the receiver is a matrix-vector product of the antijam filter matrix 120 and the incoming vector signals 161, 163 etc.

In cases where the directionality of the transmitter is known a-priori at the receiver, such as in a single transmitter antenna wireless communication system with a fixed transmitter-receiver pair, the omni-directional steering matrix can be replaced with a steering vector that is the directionality vector of the transmitter as seen from the receiver. The resulting antijam filter 120 is then a vector resulting from the product of the inverse of the covariance estimate matrix and the steering (directionality) vector. Where the transmitter and receiver have a non-zero relative velocity with respect to each other, the steering vector and antijam filter need to be updated periodically.

The transmitter 110 and receiver 150 re-engage after the interference-plus-noise covariance estimation step, 230 or 275. All subsequent incoming signals, e.g. 161, at the receiver 150 are filtered as previously described, 240 or 280, with the antijam filter 120. The transmitter 110 and receiver 150 now coordinate to execute a beacon protocol 250 that allows the receiver to estimate the channels between the transmitter antennas, e.g. 112, and receiver antennas, e.g. 152. This can be accomplished by individually exciting the transmitter antennas, e.g. 112, with a known signal in a pre-determined sequence, such that only one transmitter antenna, e.g. 112, is active at any given time.

If the correlation of the transmitted signal, e.g. 121, with the received signal, e.g. 161, is known, an estimate 250 of the channel, e.g. 171, between the active transmitter antenna, e.g. 112, and the receiver antenna, e.g. 152, can be determined. This estimate 250 of the channel, e.g., 171, is known as the Minimum Mean Squared Error (MMSE) channel estimate, designed to minimize the mean of the squared error between the estimated channel and the actual channel. Carrying out this estimation procedure 250 for all the transmitter antennas, 112, 114 etc., leads to an estimate of the MIMO channel matrix H for MIMO processing 260 of the received data, 161, 163 etc. Other methods of MIMO channel estimation are available as well, for instance, the methods described in R. Trepkowski, "Channel Estimation Strategies for Coded MIMO Systems," M.S. Thesis, Virginia Polytechnic University, Blacksburg, Va., June 2004.

V-BLAST is a candidate MIMO detection algorithm used for decoding the symbol data streams, 121, 123 etc., from the received signals, 161, 163 etc. See e.g. U.S. Pat. Nos. 6,097,771; 6,317,466; and 6,763,073 granted to Foschini et al. V-BLAST is a nulling-and-cancellation algorithm that performs symbol-by-symbol processing of the received signals within each symbol block. In the $i^{th}$ iteration of the algorithm, the V-BLAST receiver tries to decode the $N_i$-th transmitter antenna's contribution, e.g. 121, to the received signal, e.g. 161. This is accomplished by nulling the contribution of the other transmitter antennas, e.g. 123, from the $i^{th}$ iteration received signal, $r_i$. The resultant value is used to identify the symbol transmitted by antenna $N_i$. The contribution of this antenna is then cancelled from $r_i$ to obtain $r_{i+1}$, the $(i+1)^{th}$ iteration received signal, and so forth. In any given iteration, the receiver antenna data stream, e.g. 161, with the highest signal-to-noise ratio (SNR) is selected for decoding, as this constitutes the optimal ordering strategy.

Although the V-BLAST iterative detection method is computationally efficient and promises data transmission rates close to the theoretical maximum, it fails in the presence of co-channel interference. It treats the interference as background noise, and is thus unable to utilize the interference signal's statistics to gain immunity. The antijam filter 120 herein enhances V-BLAST processing by filtering the interference, e.g. 191, from the received signals, thereby permitting high throughput decoding of the signals, e.g. 121, from the desired user transmitter 110.

The instant invention also incorporates well with other MIMO detection algorithms. For instance, the optimal MIMO detection algorithm, i.e., one providing the statistically best performance among all the detection algorithms, uses the Maximum Likelihood (ML) criterion, See e.g. S. J. Grant and J. K. Cavers, "Performance Enhancement Through Joint Detection of Cochannel Signals Using Diversity Arrays," IEEE Transactions on Communications, Vol. 46, No. 8, August 1998, pp 1038-1049. The ML criterion allows detection of the transmitted data stream at the receiver by maximizing the probability of receiving the given sequence under noisy channel conditions. For the Additive White Gaussian Noise (AWGN) communication channel, i.e., one that adds noise with Gaussian statistical distribution to the received signal, the ML criterion leads to a minimum distance detector (AWGN-ML detector), which determines the transmitted symbol as being the one closest to the received symbol. The complexity of this algorithm scales exponentially with constellation size, comprising the set of all the symbols in the communication system. So, while the AWGN-ML detector is prohibitive for large constellations, it is useful for smaller ones. It too fails, however, in the presence of jammers. But, if used in conjunction with the antijam filter herein, the degraded error rate performance can be substantially recovered.

Figure 3:
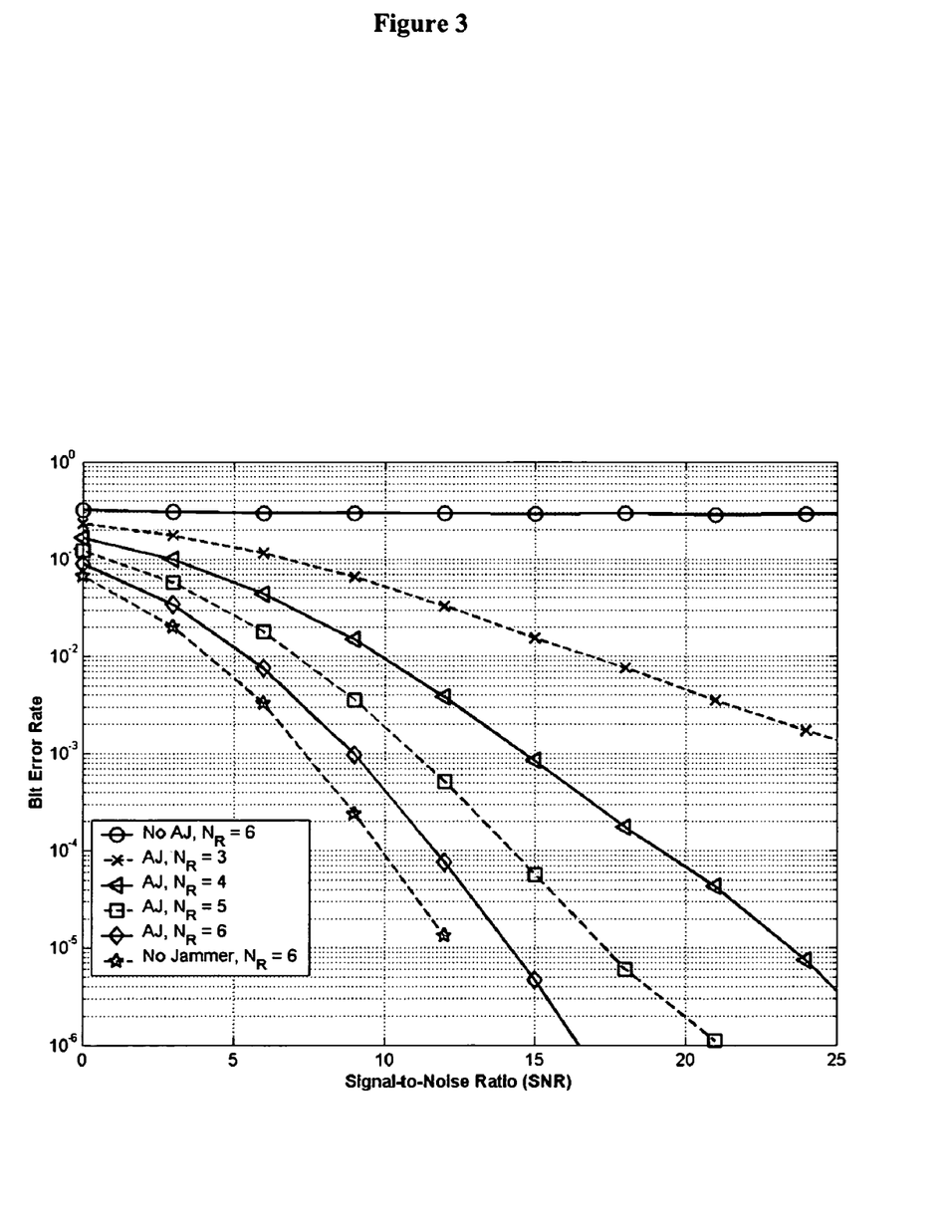
FIG. 3 illustrates the performance of MIMO-with-Antijam compared to MIMO-without-Antijam for a single carrier wireless communication system using a V-BLAST MIMO receiver.

FIG. 3 presents the results of a MATLAB simulation showing the bit error rate improvement achieved, as a function of SNR, when using the instant antijam filter with V-BLAST as the MIMO detection algorithm. The communication system is modeled with Gray coded 4-QAM modulation, two transmitter antennas ($N_T$=2), and quasi-static Rayleigh fading channels. The transmitter and receiver antennas are modeled as dipoles spaced one-half wavelength apart from each other. A line-of-sight jammer at a 60° angle of incidence from the receiver and operating at the same power level as the data from the desired user is assumed.

The number of receiver antennas in FIG. 3 varies from $N_R$=2 to $N_R$=6, with the jammer being in the active or inactive state. The bit error rate curves are bounded on the high side by the $N_R$=6 curve corresponding to an active jammer but no antijam. On the low error rate extreme is the $N_R$=6 curve corresponding to where the jammer is inactive, i.e. there are no interference signals present. The middle four curves represent improvements to the bit error rate performance in the presence of jamming, obtained by varying the number of receiver antennas and applying antijam filtering. The bit error rate reduces with increasing number of receiver antennas until, at $N_R$=6, the antijam enhanced processing results in error rates close to where the jammer is inactive with the same number (six) of receiver antennas.

Figure 4:
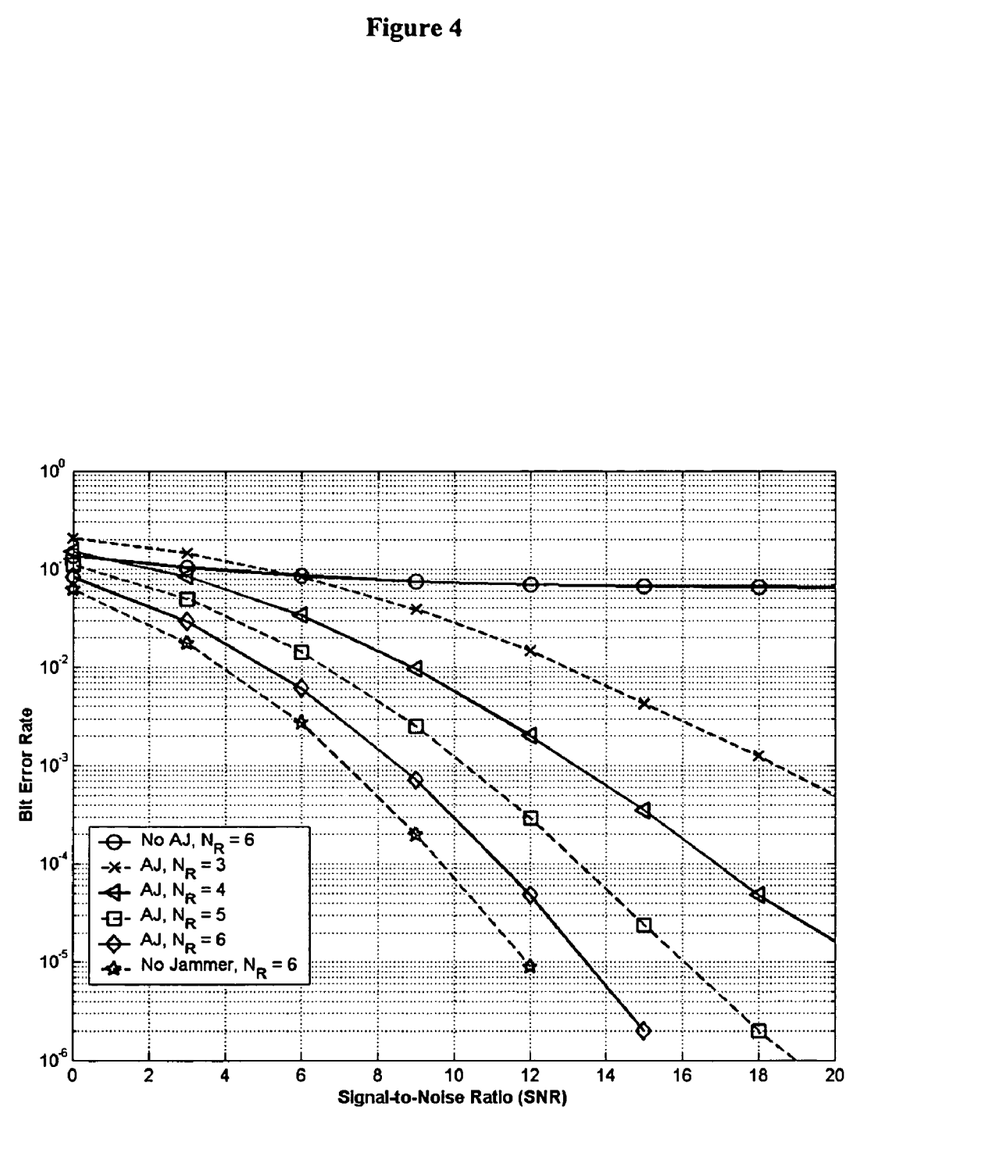
FIG. 4 illustrates the performance of MIMO-with-Antijam compared to MIMO-without-Antijam for a single carrier wireless communication system using a minimum distance detector, which is the Maximum Likelihood (ML) detector for Additive White Gaussian Noise (AWGN) channel.

FIG. 4 presents the performance of the system in FIG. 3, with the MIMO AWGN-ML detector substituted for the V-BLAST detector. The trend in both figures is the same, illustrating the modularity of the antijam filter and method herein for improving the performance of communication systems employing different detection schemes, for example V-BLAST as well as AWGN-ML MIMO.

Figure 5:
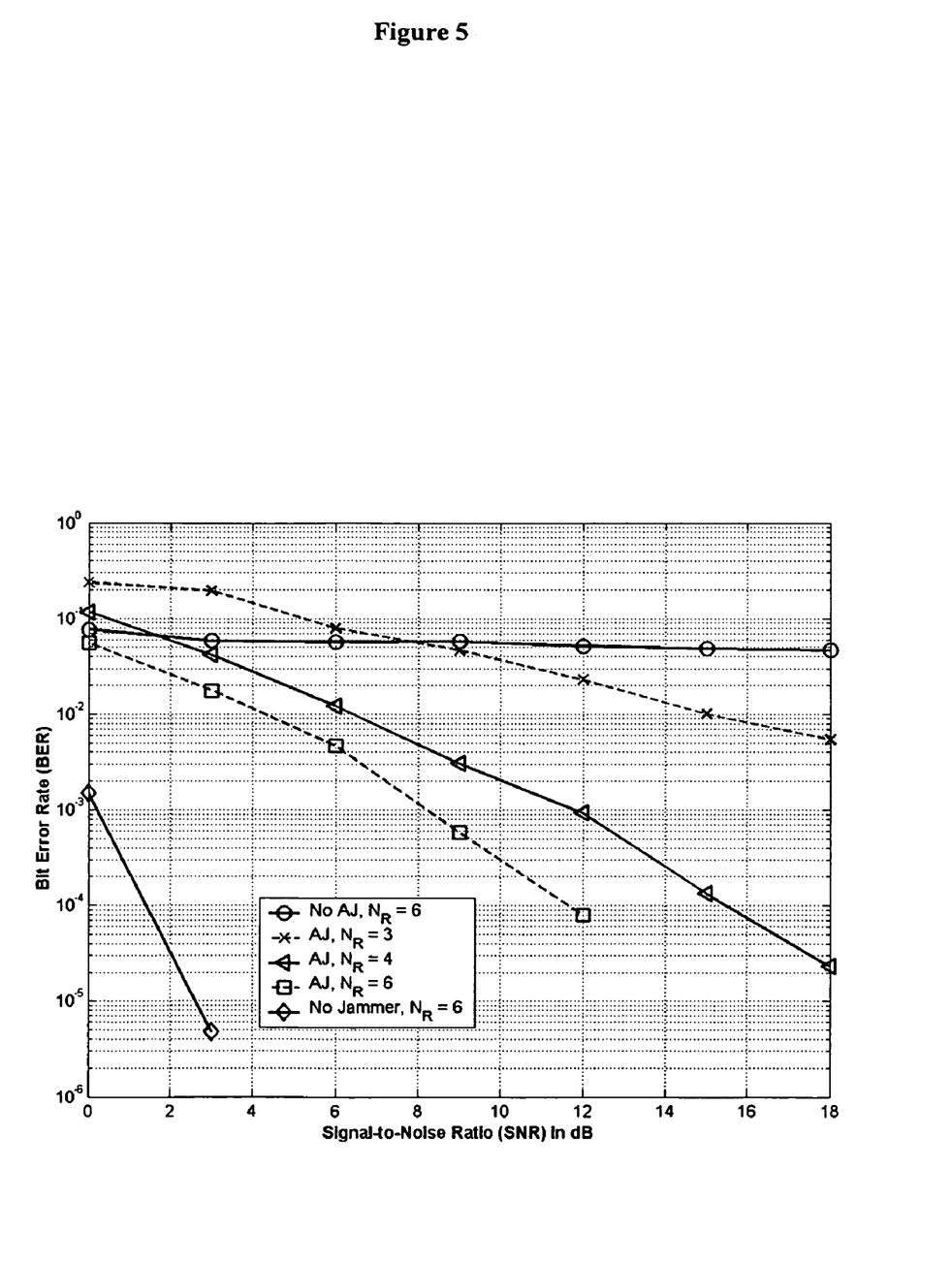
FIG. 5 illustrates the performance of MIMO-with-Antijam compared to MIMO-without-Antijam for an OFDM wireless communication system based on IEEE 802.11a standard specifications, using a V-BLAST MIMO receiver.

While the above discussion shows the general utility of the antijam filter in low error rate wireless communication, FIG. 5 presents the results for a specific system, namely a multiple antenna OFDM-based IEEE 802.11a PHY system with MIMO enhancement. The system uses a 4-QAM constellation and a rate ½ convolution code. The simulation uses Jakes' channel model, a popular mathematical model for wireless communication channels. A mobile receiver, moving at a velocity of 5 kilometers per hour, is assumed. As before, the antijam filter improves the performance significantly with an active jammer. With $N_R$=4 and SNR=18 dB, a bit error rate of close to $10^{-5}$ is achieved. The bit error rate reduces to zero in the simulation with $N_R$=6 and SNR=15 dB, and does not consequently register on the plot. These results show that the antijam filter herein renders high-fidelity communication possible in a jamming environment. Without it, the very high error rate of about $10^{-1}$ is obtained, even with $N_R=6$, making communication impossible.

Figure 6:
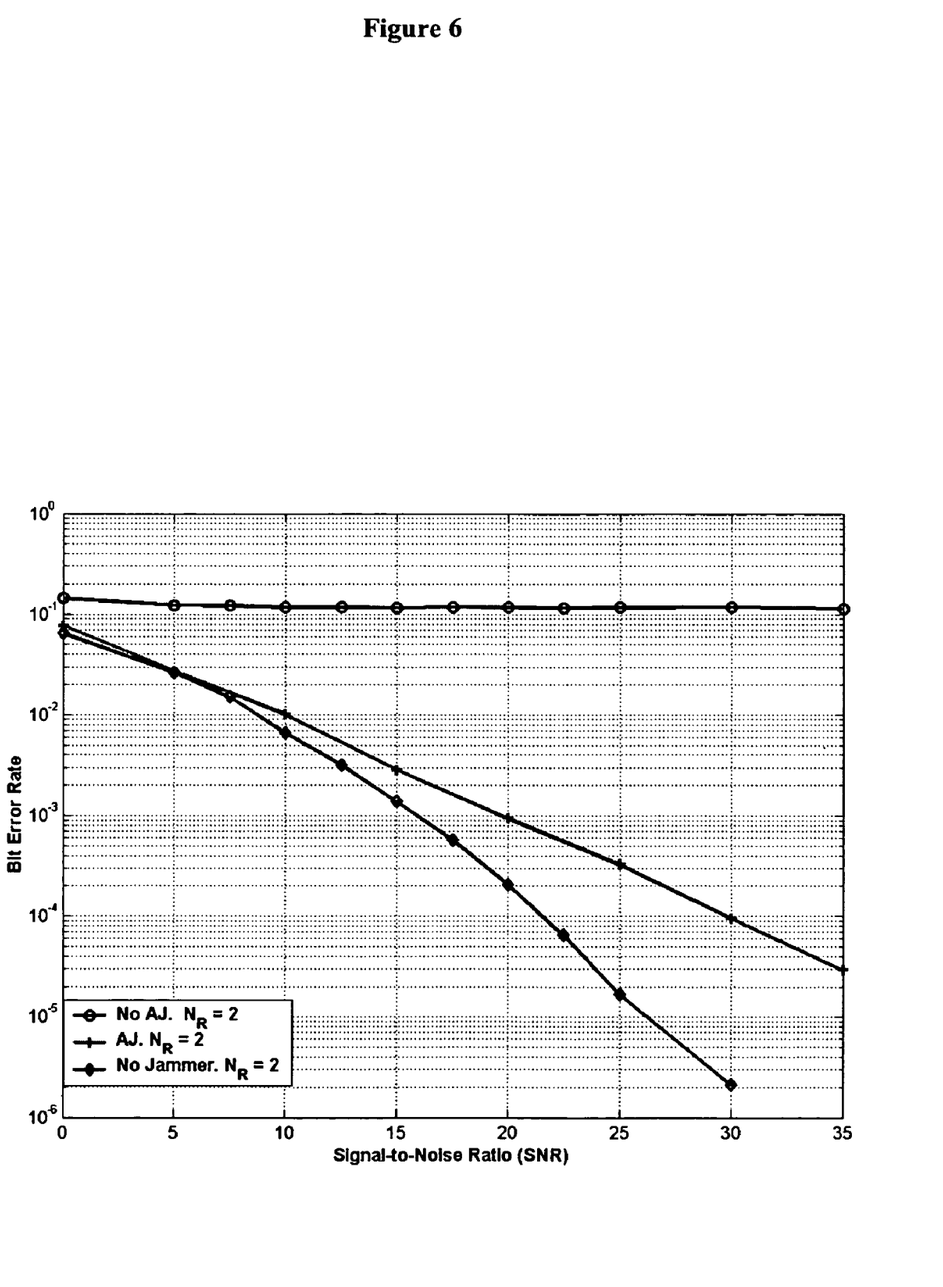
FIG. 6 illustrates the performance of MIMO-with-Antijam compared to MIMO-without-Antijam for a UMTS TDD 3G standards-based communication system, using a ML MIMO receiver.

FIG. 6, similarly, shows the disruption in communication from a high-powered jammer in a Universal Mobile Telecommunications System (UMTS) Time Division Duplex (TDD) 3G standards based Wideband Code Division Multiple Access (WCDMA) wireless communication system. The system model in FIG. 6 comprises one transmitter antenna and two receiver antennas, with Maximal Ratio Combining (MRC) at the receiver. The MRC is an optimal ML receiver detection algorithm that maximizes the receiver SNR by combining all the receiver antenna outputs per symbol interval coherently to make decisions on the transmitted symbol, using the minimum distance metric. Receiver MRC uses two antennas, each having at most four fingers. No coding is used. Spreading factors, also known as processing gain, of 1, 2, 4, 8, and 16 are chosen with equal probability for each slot. The channel is modeled as Rayleigh fading. The use of antijam restores performance within a few dB of a channel unimpaired by jamming.

Figure 7:
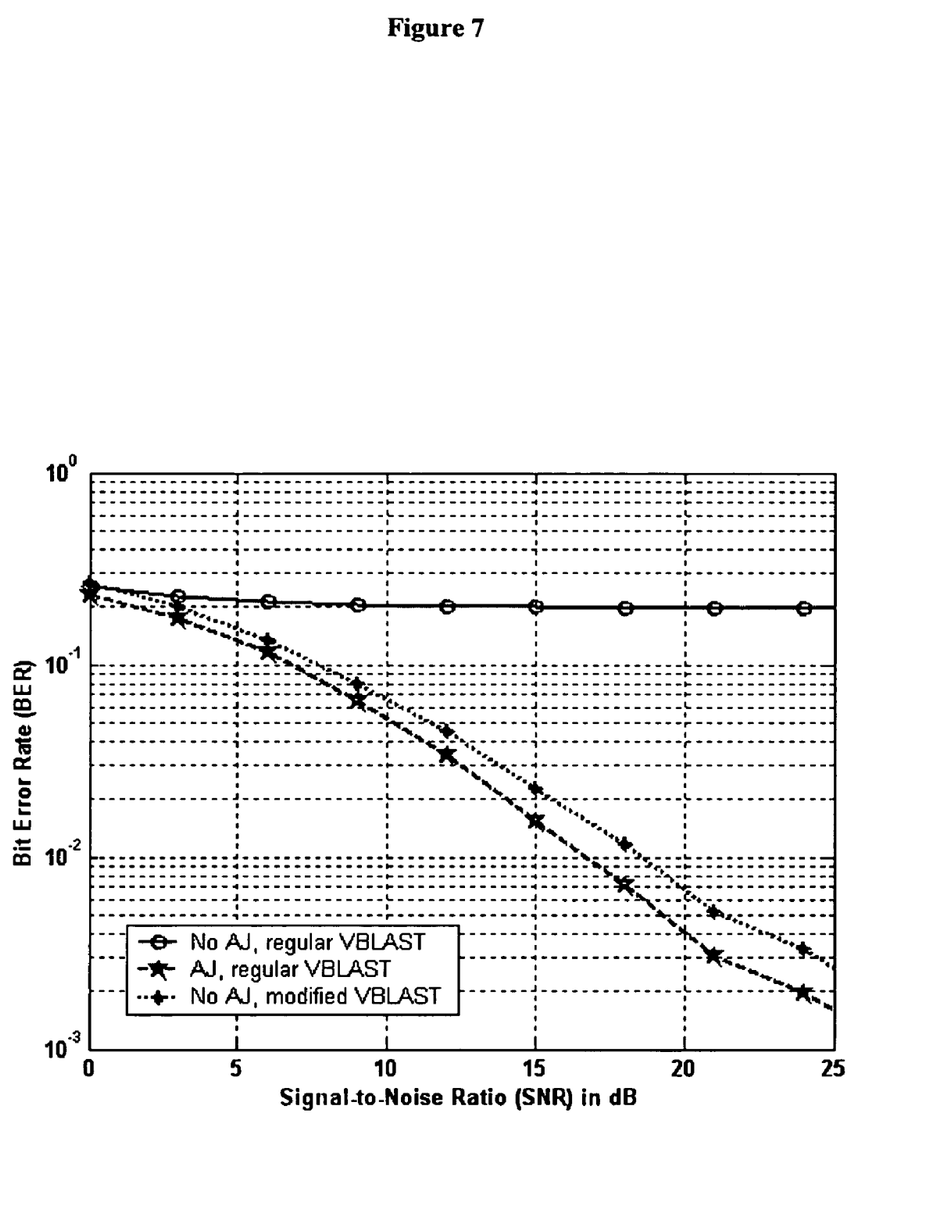
FIG. 7 illustrates the performance of MIMO-with-Antijam compared to MIMO-without-Antijam for a single carrier wireless communication system using a V-BLAST MIMO receiver in the presence of an unintentional interferer of the same modulation format as the desired user.

FIG. 7 illustrates the benefit of using the antijam filter even where MIMO data detection is disrupted by a "friendly" interferer, i.e., a user in the system whose communication, which is of the same format as the desired user's, unintentionally interferes with the communication of the desired user. Mitigation can include either using the antijam filter herein or modifying the MIMO detection algorithm (e.g. V-BLAST) to explicitly account for the "friendly" interferer. This latter approach entails significantly higher computational complexity, and requires explicit decoding of the interferer. FIG. 7 shows that the unmodified V-BLAST with antijam (AJ) performs better than modified V-BLAST.

Figure 8:
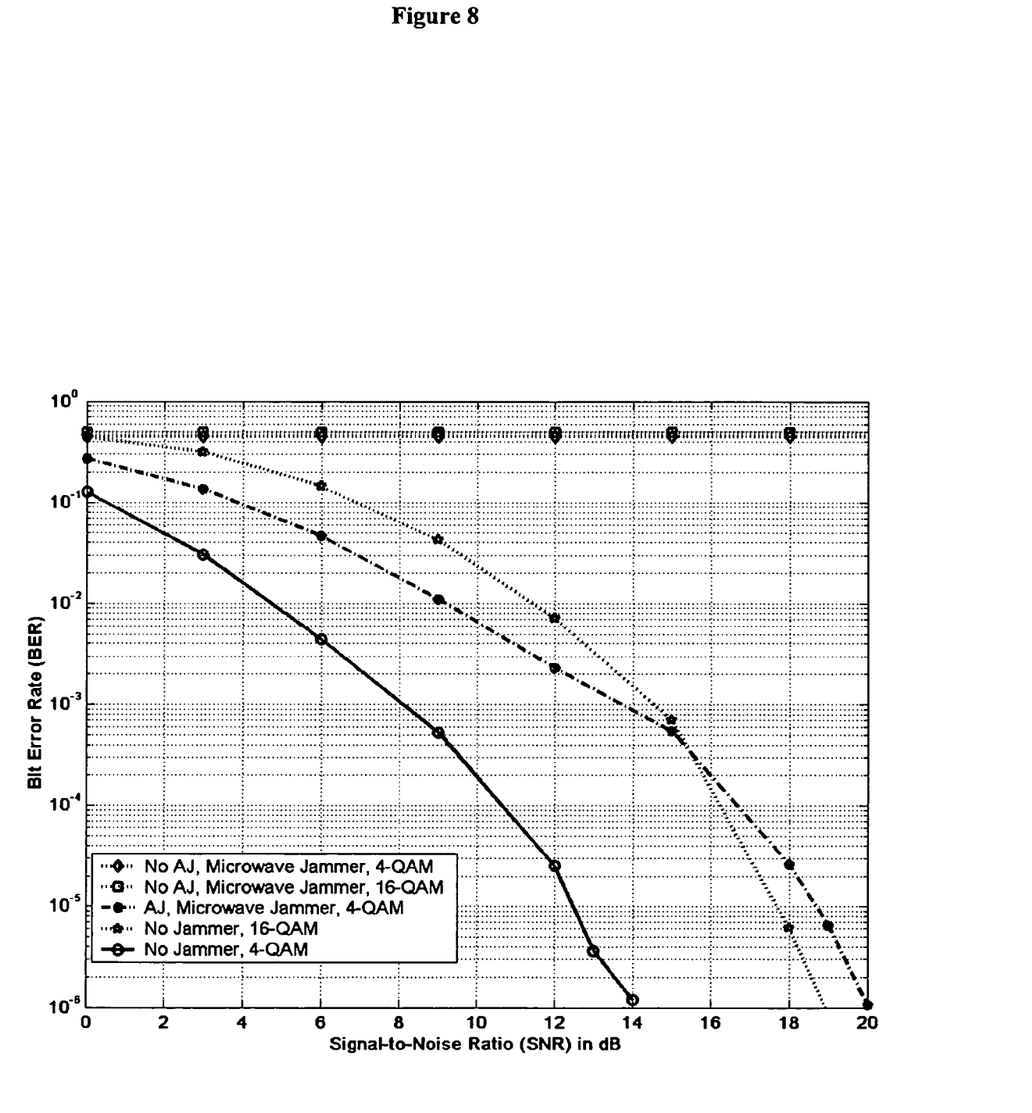
FIG. 8 illustrates the performance of MIMO-with-Antijam in an OFDM wireless communication system based on the IEEE 802.11 g standard specifications, using a ML detector, with and without interference from a residential microwave oven.

IEEE 802.11b/g WLAN devices that operate in the 2.4 GHz ISM band suffer interference from other devices (such as, residential microwave ovens and cordless phones) operating in the same frequency range. FIG. 8 shows that with no interference signals, acceptable BER values are obtained for both 4-QAM and 16-QAM constellation IEEE 802.11g communication devices, as expected. The communication is rendered impossible for both 16-QAM and 4-QAM constellation devices in the presence of signals from a 800 Watt Type A-Magnetron microwave oven whose Effective Isotropic Radiated Power (EIRP) is as shown for Oven number 1 in NTIA (National Telecommunications and Information Administration) Report No. 94-303-1. By using the antijam filter with the 4-QAM constellation, however, acceptable communication can still continue. In fact, for an SNR of 15 dB, the performance of an antijam-enabled 4-QAM constellation device, with the microwave oven on, is the same as that of the 16-QAM device with no interference present.

The instant antijam filter offers low complexity. When implemented as the inverse of the interference-plus-noise covariance estimate, the matrix inversion operation has a complexity of $O(N_R^3)$ (=On the order of $N_R^3$). The inversion, however, can be performed off-line on a per transmission-burst basis, with the added advantage of burst-by-burst tracking of the jammer statistics and thereby providing better receiver performance. The online operational complexity due to the antijam filter reduces to that of matrix multiplication, which is $O(N_R^2)$ per symbol block. This level of complexity is lower than that for the decoders and Viterbi algorithms used in many communication systems.

The antijam filter and method herein effectively mitigate both hostile jamming and unintentional interference. The antijam scheme is modular and of low complexity, and can be incorporated with relative ease in a range of wireless communication systems. The only system requirement is that the receiver have multiple antennas. Examples have been presented that demonstrate the versatility of the antijam filter in conjunction with a single user system (FIGS. 3, 4), a multi-user OFDM based system (FIG. 5), and a multi-user CDMA based system (FIG. 6). Although the analyses presented have assumed only spatial diversity, other diversity techniques, such as time/frequency diversity, can be applied over the spatial diversity to provide for additional gains in system performance.

We claim:

1. A multiple antenna receiver for a wireless communication system comprising:
   a plurality of antennas configured to receive multi input multi output signals from a desired user transmitter; and
   an antijam filter for filtering interference signals from the received signals, said antijam filter configured to:
      identify the desired user transmitter,
      negotiate a quiet period with the identified desired user transmitter,
      generate the interference statistics during the negotiated quiet period,
      filter the interference signals received with the multi input multi output signals by applying to
      the received signals the generated interference statistics; and
      render the filtered multi input multi output signals for additional processing.

2. The receiver of claim 1, wherein the receiver antennas are spaced apart from each other by at least one-half wavelength at the desired user frequency.

3. The receiver of claim 1, wherein the desired user transmitter includes at least two antennas.

4. The receiver of claim 3, wherein the receiver has a greater number of antennas than the desired user transmitter.

5. The receiver of claim 1, wherein the multi input multi output signals include spatially multiplexed signals.

6. The antijam filter of the receiver in claim 1 wherein identifying the desired user transmitter includes searching for a beacon signal from said transmitter.

7. The antijam filter of the receiver in claim 6, wherein identifying the desired user transmitter further includes receiving a beacon signal from said transmitter.

8. The antijam filter of the receiver in claim 1, wherein generating the interference statistics includes estimating a covariance matrix of the interference and noise signals.

9. The antijam filter of the receiver in claim 8, wherein filtering the interference signals by applying to the received signals the generated interference statistics includes use of the covariance matrix.

10. The antijam filter of the receiver in claim 1, wherein additional processing includes multi input multi output signal processing.

11. A multiple antenna receiver for a wireless communication system comprising:
    a plurality of antennas configured to receive multi input multi output signals from a desired user transmitter; and
    an antijam filter for filtering interference signals from the received signals, said antijam filter configured to:
       generate the interference statistics with the received signals,
       filter the interference signals from the received signals by applying the generated interference statistics to the received signals,
       detect in the filtered signals an identification signal from the desired user transmitter, and render filtered multi input multi output signals containing the detected identification signal for additional processing.

12. The receiver of claim 11, wherein the receiver antennas are spaced apart from each other by at least one-half wavelength at the desired user frequency.

13. The receiver of claim 11, wherein the desired user transmitter includes at least two antennas.

14. The receiver of claim 13, wherein the receiver has a greater number of antennas than the desired user transmitter.

15. The receiver of claim 11, wherein the multi input multi output signals include spatially multiplexed signals.

16. The antijam filter of the receiver in claim 11, wherein generating the interference statistics includes estimating a covariance matrix of the interference and noise signals.

17. The antijam filter of the receiver in claim 16, wherein filtering the interference signals by applying to the received signals the generated interference statistics includes use of the covariance matrix.

18. The antijam filter of the receiver in claim 11, wherein detecting in the filtered signals an identification signal includes detecting a beacon signal.

19. The antijam filter of the receiver in claim 11, wherein additional processing includes multi input multi output signal processing.

20. A wireless communication system comprising:
At least one transmitter having a plurality of antennas for transmitting multi input multi output signals from the desired user;
At least one receiver having a plurality of antennas for receiving multi input multi output signals from the desired user transmitter; and
an antijam filter for filtering interference signals received with the multi input multi output signals;
said antijam filter including means for
identifying the desired user transmitter,
negotiating a quiet period with the identified desired user transmitter,
generating the interference statistics during the negotiated quiet period,
filtering the interference signals received with the multi input multi output signals by applying the generated interference statistics to the received signals, and
rendering filtered multi input multi output signals for additional processing.

21. The wireless communication system of claim 20, wherein the receiver antennas are spaced apart from each other by at least one-half wavelength at the desired user frequency.

22. The wireless communication system of claim 20, wherein the receiver has a greater number of antennas than the desired user transmitter.

23. The wireless communication system of claim 20, wherein the multi input multi output signals include spatially multiplexed signals.

24. The wireless communication system of claim 20, wherein the antijam filter means for identifying the desired user transmitter includes searching for a beacon signal from the desired user transmitter.

25. The wireless communication system of claim 24, wherein the antijam filter means for identifying the desired user transmitter further includes receiving a beacon signal from said transmitter.

26. The wireless communication system of claim 20, wherein the antijam filter means for generating the interference statistics includes estimating a covariance matrix of the interference and noise signals.

27. The wireless communication system of claim 26, wherein the antijam filter means for filtering the interference signals by applying to the received signals the generated interference statistics includes use of the covariance matrix.

28. The wireless communication system of claim 20, wherein the antijam filter means for additional processing includes multi input multi output signal processing.

29. A wireless communication system comprising:
At least one transmitter having a plurality of antennas for transmitting multi input multi output signals from the desired user;
At least one receiver comprising a plurality of antennas for receiving multi input multi output signals from the desired user transmitter; and
an antijam filter for filtering interference signals received with said multi input multi output signals;
said antijam filter including means for
generating the interference statistics for the received signals,
filtering the interference signals from the received signals by applying the generated
interference statistics to the received signals,
detecting in the filtered signals an identification signal from the desired user transmitter, and
rendering the filtered multi input multi output signals containing the detected identification signal for additional processing.

30. The wireless communication system of claim 29, wherein the receiver antennas are spaced apart from each other by at least one-half wavelength at the desired user frequency.

31. The wireless communication system of claim 29, wherein the receiver has a greater number of antennas than the desired user transmitter.

32. The wireless communication system of claim 29, wherein the multi input multi output signals include spatially multiplexed signals.

33. The wireless communication system of claim 29, wherein the antijam filter means for generating the interference statistics includes estimating a covariance matrix of the interference and noise signals.

34. The wireless communication system of claim 33, wherein the antijam filter means for filtering the interference signals by applying to the received signals the generated interference statistics includes use of the covariance matrix.

35. The wireless communication system of claim 29, wherein the antijam filter means for detecting in the filtered signals an identification signal includes detecting a beacon signal.

36. The wireless communication system of claim 29, wherein the antijam filter means for additional processing includes multi input multi output signal processing.

37. A method for filtering interference signals from the multi input multi output signals received at a wireless communication system receiver having multiple antennas comprising the steps of:
identifying the source of the multi input multi output signals;
negotiating a quiet period with the identified source of the multi input multi output signals;
generating the interference statistics during the negotiated quiet period;
filtering the interference signals from the received signals by applying the generated interference statistics to the received signals; and
rendering the filtered signals for additional processing.

38. The method of claim 37, wherein the source of the multi input multi output signals includes a transmitter.

39. The method of claim 38, wherein the transmitter has at least two antennas.

40. The method of claim 37, wherein the multi input multi output signals include spatially multiplexed signals.

41. The method of claim 37, wherein identifying the source of multi input multi output signals includes searching for a beacon signal from the desired user transmitter.

42. The method of claim 41, wherein identifying the source of multi input multi output signals further includes receiving a beacon signal from said transmitter.

43. The method of claim 37, wherein generating the interference statistics includes estimating a covariance matrix of the interference and noise signals.

44. The method of claim 43, wherein filtering the interference signals by applying to the received signals the generated interference statistics includes use of the covariance matrix.

45. The method of claim 37, wherein additional processing includes multi input multi output signal processing.

46. A method for filtering interference signals from the multi input multi output signals received at a wireless communication system receiver having multiple antennas comprising the steps of:

generating the interference statistics for the received signals;

filtering the interference signals from the received signals by applying the generated interference statistics to the received signals;

detecting in the filtered signals an identification signal from the desired user transmitter; and rendering the filtered signals containing said identification signal for additional processing.

47. The method of claim 46, wherein the multi input multi output signals include spatially multiplexed signals.

48. The method of claim 46, wherein generating the interference statistics includes estimating a covariance matrix of the interference and noise signals.

49. The method of claim 48, wherein filtering the interference signals by applying to the received signals the generated interference statistics includes use of the covariance matrix.

50. The method of claim 46, wherein detecting in the filtered signals an identification signal includes detecting a beacon signal.

51. The method of claim 46, wherein additional processing includes multi input multi output signal process

* * * * *